United States Patent Office 3,743,576
Patented July 3, 1973

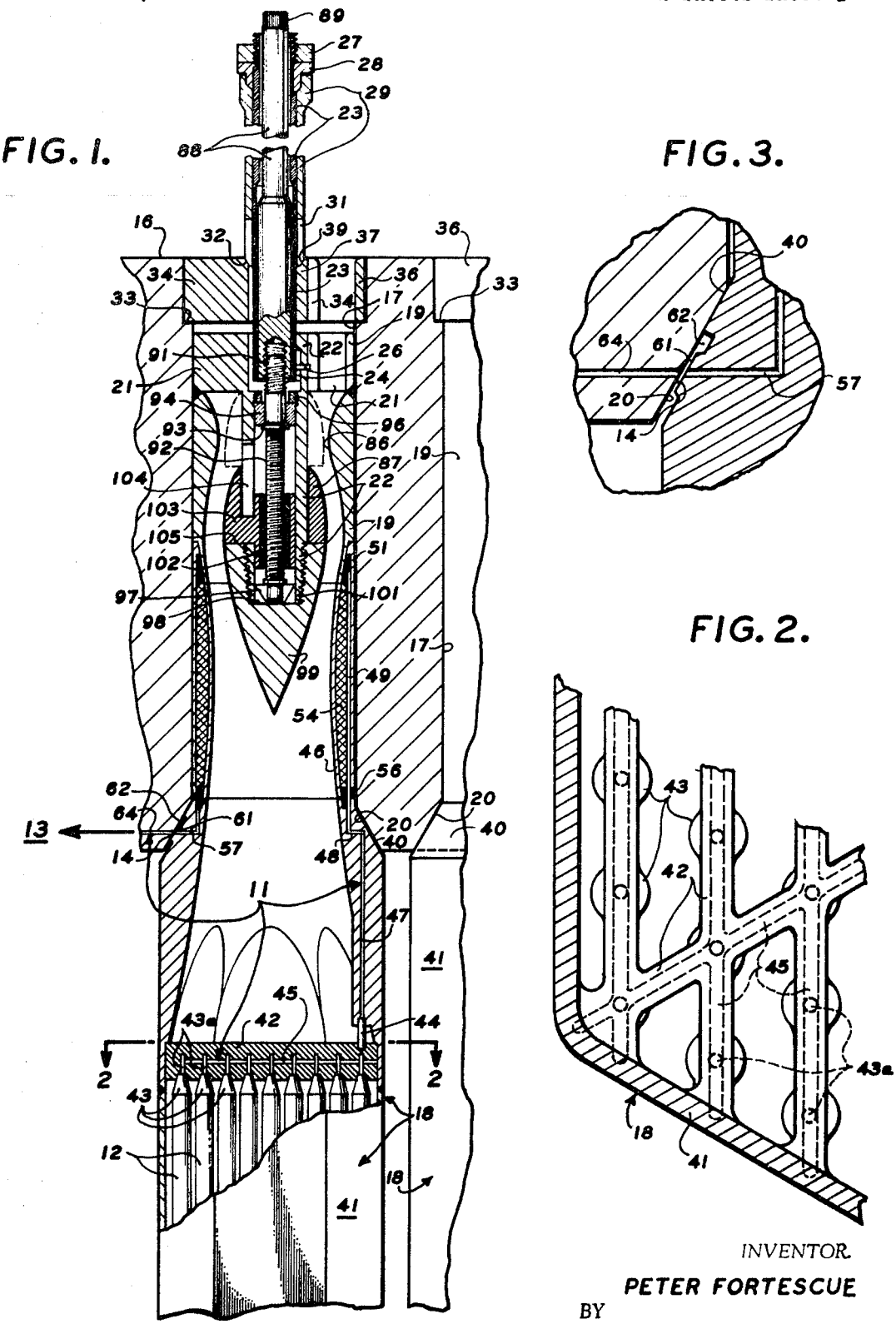

3,743,576
FUEL ELEMENT AND VENTING
SYSTEM USING SAME
Peter Fortescue, La Jolla, Calif., assignor to Gulf Energy & Environmental Systems, Inc., San Diego, Calif.
Filed Oct. 3, 1969, Ser. No. 863,497
Int. Cl. G21c 17/06
U.S. Cl. 176—37                                    7 Claims

ABSTRACT OF THE DISCLOSURE

A venting system is described for a gas cooled nuclear reactor having a plurality of containers for fissionable material. A vent passage system is provided for conducting fission products from the containers to a fission product receiving system. The receiving system and the vent passage system are at a lower pressure than the ambient pressure of the coolant gas. At least one bleed passage is provided adjacent the containers communicating from the cooling system of the reactor to the vent passage system for bleeding coolant gas into the vent passage system, thereby speeding the transportation of fission products to the receiving system, and so reducing the deposition of solids decaying therefrom in the connecting ducting. Also described is a fuel element for use in such a reactor, such fuel elements having a self-containing variable position plug and orifice arrangement for varying the flow of coolant through the fuel element.

This invention relates to gas cooled nuclear reactors and, more particularly, to a venting system for containers of fissionable material in a gas cooled nuclear reactor, and to an improved fuel element for use in a gas cooled nuclear reactor.

In gas cooled nuclear reactors which employ solid nuclear fuel, it is often desirable to clad the nuclear fuel with a suitable material, such as a metal, which will effectively separate the fuel from the gas coolant stream that is circulated through the reactor core to extract the heat therefrom. The cladding prevents contamination of the coolant by the fuel material and fission products produced during reactor operation and, where pellets of fissionable material are used, helps confine the pellets to the desired location. Throughout its life in the core of a nuclear reactor, the cladding is subjected to prolonged periods of high irradiation and high temperature. The cladding shoul be capable of maintaining its integrity for a period of time beyond the maximum anticipated life of the fuel.

During the life of the fissionable material, fission products in the form of gases are generated and are contained by the cladding. The amount of fission products produced typically depends, among other things, on the total burn-up of the fuel. Hermetically sealed cladding would have to contain high compressive loads from the coolant pressures, unbalanced by fission gas pressure early in life, and also high tensile loads from internal pressures late in life, and when the coolant system was depressurized as required for removal and transport of expended fuel.

One way of alleviating the foregoing problem is to provide means to vent the gaseous fission products from the containers for the fissionable material. By removing the gaseous fission products from the immediate vicinity of the reactor core and storing them either exteriorly of the reactor or in some other part of the reactor, the effect of the build up of fission products on the neutron economy of the reactor core is also minimized. Various arrangements have previously been proposed for removing fission products from fuel containers in a nuclear reactor core. For example, U.S. Pat. No. 3,201,320 shows the creation of a purge gas flow through a porous graphite section of each fuel element employed in a gas cooled reactor. The gas flow is channelled by a passageway network to an isolated portion of the reactor. Another example is shown in U.S. Pat. No. 3,432,388 in which gaseous fission products are vented to evacuated storage vessels in a way which maintains the internal pressure within the cladding proportional to the external pressure of the gas coolant.

In addition to providing some increase in the neutronic economy of the reactor core, removal of the fission products from an otherwise sealed fuel container can allow the spent fuel container to be shifted to a remote reprocessing cite without individual depressurization of each container or without the hazard of shipping the fuel element containers in a pressurized condition. Venting of the fission products substantially reduces the need to provide an internal void space for containment of the gaseous fission products thereby enabling the fuel containers to be made smaller, with a consequent reduction in core size. Moreover, such venting provides the possibility of providing thinner cladding for the containers thereby benefitting both cooling and neutron absorption.

In venting systems for nuclear reactors having a plurality of otherwise sealed containers for fissionable material, one or more internal fission product traps may be utilized in the core to delay the diffusion of fission gas from the containers into the portion of the venting system leading to the final external fission product traps. This delay allows time for the high activity, short half-life fission products to decay prior to the time the fission gas leaves the core. Ambient pressure fluctuations may result in a breakaway flow from some of the internal traps. If this breakaway flow accumulates in a given area in the venting system, substantial local decay at such points may have a deleterious effect on reactor operation.

Another problem encountered in the design of gas cooled nuclear reactors is in the control of the flow of gaseous coolant over the clad fuel containers. Various arrangements have been devised to enable control of the flow of gaseous coolant over the fuel containers. Many of these prior art structures or orificing devices have been subject to the difficulty of unduly impeding coolant flow or producing undesired perturbation therein. Frequently, the accuracy of adjustment has been limited and the distribution of the flow pattern within the fuel element may vary with the amount the orificing device is opened. Finally, control over such prior art orificing devices has often been difficult and unwieldy to effect, and such devices have often offered too high a resistance to coolant flow when in the open position.

It is an object of the present invention to provide an improved fuel container venting system for a gas cooled nuclear reactor.

Another object of the invention is to provide an improved fuel element for use in a gas cooled nuclear reactor.

Still another object of the invention is to provide a venting system which ensures that any break away flow from internal traps is prevented from accumulating locally in the venting system.

It is another object of the invention to provide means for readily detecting any in-leaks into the fuel containers upstream of internal traps.

Other objects of the invention will become apparent to those skilled in the art from the following description, taken in connection with the accompanying drawings wherein:

FIG. 1 is a partially sectional view of part of a reactor core arrangement having a venting system and fuel elements constructed in accordance with the invention;

FIG. 2 is an enlarged portion of a sectional view taken along the lines 2—2 of FIG. 1;

FIG. 3 is an enlarged sectional view of a portion of the arrangement of FIG. 1.

Figure 4:
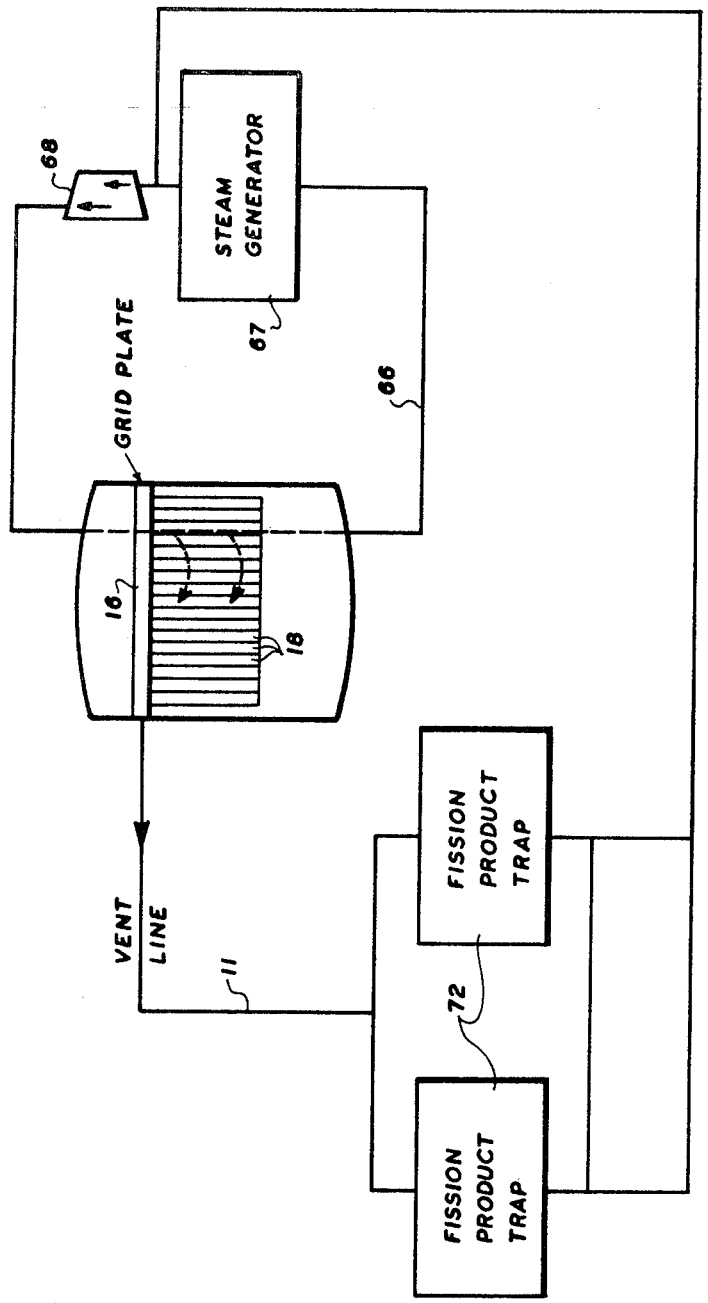
FIG. 4 is a schematic diagram illustrating the flow of the venting system of FIG. 1.

Very generally, the venting system of the invention comprises means defining a vent passage system 11 for conducting fission products from otherwise sealed containers 12 for fissionable material. A fission product receiving system 13 communicates with the vent passage system and includes means for maintaining the pressure therein and in said vent passage system substantially less than the coolant gas pressure. The receiving system has a lower pressure than the vent passage system so that fission products will pass from the containers through the passages to the receiving system. At least one bleed passage 14 per fuel element is provided communicating from the cooling system of the reactor to the vent passage system for bleeding coolant gas into the vent passage system to thereby facilitate the transportation of fission products to the receiving system.

Referring now more particularly to the drawings, the general construction of the reactor is of the type illustrated in U.S. Pat. No. 3,533,911, issued Oct. 13, 1970 and includes a grid structure 16 comprised of a plurality of vertical plates arranged to form receptacles 17 for receiving the upper ends of a plurality of fuel elements 18. The cross sections of the receptacles 17 and the upper ends of the fuel elements 18 may be rectangular as shown in the aforementioned U.S. patent, or may be circular as shown in the drawings, or may be any other convenient shape. The grid structure 16 is provided with annular bevelled surfaces 20 surrounding the lower ends of the receptacles 17.

The fuel elements 18 each include an upper section consisting of an outer cylindrical wall 19 defining the top part of a tubular housing and which is received in an associated receptacle 17. Three webs 21 project inwardly at 120° intervals from the cylindrical wall 19. The webs 21 are shown in FIG. 1 with one web in section to more clearly illustrate its constructional detail. The webs terminate in a central collar 22. The collar 22 is hollow and is releasably attached to the lower end of a support sleeve 23 by a bayonet type coupling. A part of this coupling is shown in FIG. 1 consisting of an outwardly extending projection 24 (one of three) from the support sleeve 23 and an inwardly extending insert 26 (one of three) through the wall of the collar 22. When the weight on the sleeve is relieved and the sleeve 23 is rotated with respect to the fuel element collar 22, the projections 24 are moved out from underneath the inserts 26 so that the fuel element 18 is released from the support sleeve 23. The support sleeve may be used to lower the fuel elements 18 from the receptacles 17 in the grid structure 16 into a refueling machine (not shown) and to move fresh fuel elements from the refueling machine up into position in the reactor core in the grid receptacles. An example of such a technique is described in the above-mentioned patent application.

In order to support the support sleeve 23, and accordingly support the fuel element 18, the support sleeve is carried through a suitable penetration in the reactor vessel, not illustrated, to a positive exteriorly of the reactor vessel. The broken out section at the top of FIG. 1 illustrates the exterior connections of the support sleeve 23. The support sleeve 23 is threaded at its upper end and a nut 27 is attached thereto. The nut 27 is tightened against a thrust washer 28, and this load, in turn, is transmitted through a thrust tube 29 which is coaxial with the support sleeve 23. The thrust tube 29 extends through the penetration in the unillustrated reactor vessel back down toward the grid structure 16. The lower end of the thrust tube 29 is provided with a series of slots 31 forming a collet section the lower end of which terminates in a bevel 32.

The grid structure 16 includes a plurality of grid inserts disposed in suitably machine recesses 33 at the upper ends of the receptacles 17. Each grid insert consists of three inwardly extending webs 34 which extend inwardly at 120° intervals from the cylindrical outer wall 36 and which terminate in a central collar 37. The outer wall 36 of the grid insert seats in the recess 33 and may be welded therein. The upper end of the collar 37 is provided with a bevelled surface 39 against which the collet section of the thrust tube 29 bears. When the nut 27 is tightened against the washer 28, thrust is transmitted through the thrust tube 29 to the grid insert at the bevelled surface 39. Accordingly, the grid structure 16 supports the fuel elements 18 even though the connections between the supports and the fuel elements (at the nut 27) are brought out to positions exteriorly of the reactor vessel.

The lower portion of the tubular housing of each fuel element 18 is formed by an outer hexagonal wall 41 which is of slightly larger outside dimension than the wall 19. An annular bevelled surface 40 links the outer surface of the wall 19 and the outer surface of the wall 41. The bevelled surface 40 mates against the bevelled surface 20 on the grid structure 16 when the nut 27 is tightened. The fuel containers 12 are supported within the hexagonal wall 41 extend along most of the length of the wall. Each of the fuel containers or pins 12 includes an outer cladding suitably sealed at its top by means of a plug 43. A plurality of transverse beams 42 are provided near the top of the fuel containers 12 extending across the interior of the housing and intercepting each other to form a network, as shown in FIG. 2. These beams are secured to the plugs 43 at the upper ends of the fuel pins to hold the fuel pins in the illustrated positions. The sealed interiors of the fuel containers 12 communicate with passages 45 in the beams 42 through suitable passages 43a in the plugs 43. The passages 43a and 45 form part of the vent passage system 11 and manifold the containers 12. A single tube 44 extends upwardly at one side of the fuel element and communicates with the passage 45 in the beams 42. The tube 44 forms a further part of the vent passage system 11 and connects the passages 45 to an internal fission product trap, described below. A manifold system of this general type is shown and described in U.S. Pat. No. 3,432,-388.

The upper section 19 of the tubular housing of the fuel element 18 is provided with a section 46 which is hollow and which completely surrounds the fuel element. The tube 44 connects the passages 45 to a passage 47 extending vertically in the outer wall 41 of the lower portion of the fuel element 18. An L-shaped passage 48 connects the upper end of the passage 47 with the hollow interior of the section 46. A vertical tube 49 carries the fission products to the top of the hollow interior of the section 46. There, the products are discharged from the tube 49 into a region filled with porous material 51. The hollow section 46 contains a fission product trap 54 of suitable material such as an activated charcoal absorber. The fission product trap 54 extends from the porous material 51 down to a region near the closed lower end of the section 46 where further porous material 56 is provided.

During normal operating conditions, the release of gaseous and volatile fission products from the fuel contained within the fuel containers 12 first diffuse through the fuel itself into any pores or interstices in the fuel. Then, by gaseous diffusion, the fission products move through any holes and clearances in the fuel and between the fuel and the external cladding into the manifold system. Some fission product traps may also be provided within the containers 12 themselves for additional delay if needed. The gas then moves upwardly through the tube 44, the passages 47 and 48, and the tube 49 into the porous material 51. The fission products then move through the fission product trap 54, and gas passing therethrough, after a delay sufficient to allow decay of the more active fission products, is collected in the porous material 56 at the bottom thereof.

In order to remove gas from the porous material 56 beneath the fission product trap 54, an L-shaped passage 57 is provided which terminates in the bevelled shoulder 40 extending around the outside of the top of the lower portion of the fuel element 18. The shoulder 40 abuts the corresponding bevelled surface 20 on the lower part of the grid structure 16 surrounding the lower periphery of the receptacle 17. When the nut 27 is tightened, the fuel element is drawn up so that the shoulder 40 engages the grid structure for secure positioning of the fuel element.

The mouth of the passage 57 is surrounded by a projection or boss 61 which projects outwardly from a recessed section 62 in the bevelled surface 20. The projection does not extend far enough to engage the bevelled surface 20, leaving a clearance for purposes explained below. A passage 64 is provided in the grid structure 16 leading from the bevelled surface 20 and aligned with the mouth of the passage 57 to conduct gas therefrom to the receiving system 13, described in greater detail below. The passages 43a and 45, the tube 44, the passages 47 and 48, the tube 49, and the passages 57 and 64 constitute the vent passage system 11 which manifolds gaseous fission products from the sealed fuel containers 12. The passage 64 interconnects with other pasages, not shown, in the grid structure 16 to interconnect the vent passage systems of the other fuel elements in the core and conduct all fission product gases to a single receiving system.

In order to ensure that any breakaway flow from the internal trap 54 resulting from ambient pressure fluctuations is swept out of the passages leading to the receiving system 13 sufficiently rapidly to avoid substantial local decay and deposit, a bleed-in of coolant gas is utilized. Referring to FIG. 3, the coolant is added by providing a bleed passage 14, namely the clearance between the surface 20 and the projection 61. Alternatively the bleed passage may be formed by any suitable means, such as by a separate inlet passage in the fuel element or in the grid structure, or by grooves or slots in the bevelled surfaces 20 and 40. The bleed in may be from any appropriate region of the reactor, depending on the inlet pressure desired. In the illustrated embodiment, sufficient space exists between the adjacent fuel elements to permit gas to enter the region. Fission product gases for an entire core may be generated at typically 0.02 cubic feet per day. Under such circumstances, in-leakage is preferably made at such a level as to provide a dilution factor of at least 1000 to 1. For example, a 0.001 inch orifice diameter or equivalent in clearance spacing may add approximately 100 cubic feet of coolant per day in a typical reactor system, resulting in a dilution factor of 5000 to 1. The fission product gases and the coolant gas bled into the venting system flow to the receiving system 13 and the bled-in gas prevents a general build up of fission products in the various passages which would be permitted to decay if they were extracted at a lower rate. The presence of such decaying regions would cause difficulty when seeking to locate a failed rod by means of burst slug detection. That is, the effectiveness of the trap 54 is very sensitive to the flow rate in it, so that any upstream in-leak of coolant such as would result from the presence of a leak in one of the fissionable material containers 12 will result in a measurable activity increase in the extraction lines leading from the affected trap or fuel element.

To summarize, by keeping the pressure in the receiving system 13, the vent passage system 11 and the containers 12 below that of the gas coolant, any leak in the containers is inward, preventing contamination of the primary coolant loop. By diluting the effluent from the internal trap 54, any bursts in fission products entering the passages from the trap due to pressure fluctuations or cladding leaks, are swept out of passages rapidly. This avoids localized regions of decay and reduces the total line inventory of fission products. Any detected burst of activity may then be readily detected and its source located to the nearest fuel element.

Referring now to FIG. 4, a general diagram of the flow system of the reactor may be seen. The basic reactor gas coolant flow is shown by the loop 66 wherein the coolant, which in the illustrated system is helium, moves downwardly through the grid structure 16 and the reactor core comprising the fuel elements 18, through a steam generator 67 and a gas coolant circulator 68. Fission product gases are vented from the fuel containers through the passage system 11, and the bleed through orifices or passages 14 add helium coolant from the cooling system to the passage system 11. From the passage system 11, the mixture of fission product gases and helium coolant is passed through one of two external fission product traps 72 in which the remaining fission product gases are removed from the helium and appropriately stored. The purified helium is returned to a lower pressure region of the primary coolant loop 66, such as just upstream from the helium circulator 68.

The bleed passages, as previously mentioned, may be placed at any convenient place in the reactor core. The pressure of the coolant gas must be higher than the pressure in the bleed passages and in the passages leading to the external traps 72. Preferably, the vent passages to the fission product traps 72 are maintained at a pressure which is at least 1 p.s.i. below that of the coolant gas at the inlet side of the bleed passage. The total pressure differential between the bleed passages 14 and the upstream side of the helium circulator 68 may, for example, be about 10–15 p.s.i.

Returning now to FIG. 1, provision is made in the fuel element 18 itself for controlling coolant flow. Coolant flow in the fuel element is downwardly (after passing through the grid insert 36) through the upper section of the tubular housing defined by the wall 19 and then through the lower section of the tubular housing defined by the wall 41. In the lower section the flowing coolant passes over the clad fuel pins 12 to remove heat therefrom. To minimize drag, the webs 34 and 21 are of streamlined cross section, as are the beams 42.

The upper end of the wall 19 of the tubular housing is provided with a portion of varying cross section with respect to the flowing coolant, such portion being indicated generally at 86. A movable plug 87 is provided within the housing and adjacent the section 86. The plug has a shape cooperating with the shape of the varying cross section portion 86 to form an annular orifice for coolant flowing downwardly through the tubular housing. The plug is shown in solid lines in the maximum flow or open position in which it presents a minimum resistance to coolant flow. The free flow area in the annular orifice is equal to the minimum free flow area within the fuel element 18. This minimum area is maintained from the initial point of reduction to just downstream of the movable plug. The area then increases to form a diffuser section downstream of the movable plug. To decrease the coolant flow, the plug 87 is moved upstream into the minimum area inlet region. The pressure drop, which is normally associated with the decrease in area is augmented by the fact that the movable plug is in a high drag configuration in the closed position. The closed position of the plug is shown in the dotted lines in FIG. 1.

In order to move the plug 87 from the open position to the closed position and back again, a rotary actuator rod 88 is provided which extends to the exterior of the pressure vessel through the same penetration through which the support sleeve 23 extends. The actuator rod includes a geared section 89 on its upper end to enable automatic turning of the actuator rod. The actuator rod terminates with the collar 22 of the fuel element and is threaded on the upper end 91 of a threaded drive screw 92. The drive screw 92 is held within the collar 22 by an annular collar 93 extending therefrom. A retaining ring 94 sits on the collar 93 and is held in place by a threaded plug 96 which is threaded to appropriate threads in the interior of the collar 22. The lower end of the screw 92 is supported by a thrust bearing 97 which seats in the cavity 98 in a support member 99. The support member 99 is threaded onto a threaded section 101 at the lower end of the collar 22. The support member is of streamlined design to minimize drag and perturbation of coolant flow. A threaded sleeve 102 surrounds the screw 92 in threaded engagement therewith and moves axially along the screw in response to the turning thereof. The sleeve 102 is connected to the plug 87 by a series of arms 103 which extend from the sleeve through suitable slots 104 in the collar 22. Thus, when the actuator rod 88 is turned, the screw 92 is turned to move the plug axially and vary the opening of the annular orifice. When in the open position, the movable plug 87 mates with the upper end of the support member 99 at an interface 105. The orifice actuator rod may be rotated manually above the reactor or remotely by a positioning motor.

The orificing system may be designed to be "fail safe." That is, in the event of a part failure, the orifice may either remain in its original position or be returned to the open position as a result of both flow induced and gravitational forces. Another feature is that the flow can never be completely cut off even in the closed position, since there will be a finite free flow area when the plug is in that position.

It may therefore be seen that the invention provides an improved venting system for a gas cooled nuclear reactor, and an improved fuel element for use in such a reactor. The venting system prevents excessive accumulation of fission products within the core, and enables ready detection of any in-leaks. The fuel element of the invention includes a self-contained orificing system which is easily adjusted and which offers minimum resistance to coolant flow in the open position.

Various modifications of the invention in addition to those shown and described herein will become apparent to those skilled in the art from the foregoing description and accompanying drawings. Such modifications are intended to fall within the scope of the appended claims.

What is claimed is:

1. In a gas cooled nuclear reactor having a plurality of containers for fissionable material, a venting system comprising, means defining a vent passage system for conducting fission products from the containers, a fission product receiving system communicating with said vent passage system, said receiving system including means for maintaining the pressure therein and in said vent passage system substantially less than the coolant gas pressure adjacent the containers, said pressure maintaining means also being adapted to maintain said receiving system at a pressure sufficiently lower than the pressure in said vent passage system that fission products will be withdrawn from the containers through said vent passage system to said receiving system, said vent passage system defining means having at least one bleed passage therein adjacent the containers and communicating from the cooling system of the reactor to said vent passage system for bleeding coolant gas into said vent passage system, said bleed passage being of a size to admit coolant gas to said vent passage system in a quantity sufficient to facilitate the transportation of fission products to said receiving system.

2. A venting system according to claim 1 wherein said receiving system includes means for removing fission products from the coolant gas flowing from said vent passage system.

3. A venting system according to claim 1 wherein the containers are arranged in groups, wherein said vent passage system communicates with each group of containers, and wherein a fission product trap for each group of sealed containers is disposed in said vent passage system, said fission product traps being located upstream toward the container groups from said bleed passage.

4. A venting system according to claim 3 wherein a bleed passage is provided adjacent each fission product trap.

5. A venting system according to claim 1 wherein a first supporting structure is provided for supporting the containers, wherein a second supporting structure is provided for supporting said first supporting structure, wherein said means defining said vent passage system include a portion of said first supporting strure, and further includes a portion of said second supporting structure, said first and second supporting structures being in mating engagement with portions of said vent passage system in the respective support structures in alignment.

6. A system according to claim 5 wherein said means defining said vent passage system further include coupling means at the interface between said first and second supporting structures, said coupling means comprising a projection from said first supporting structure spaced from said second supporting structure to define said bleed passage, said aligned portions of said vent passage system terminating at the facing surfaces of said projection and said second supporting structure.

7. In a gas cooled nuclear reactor having a plurality of fuel elements with sealed containers therein for fissionable material, and further having a supporting structure for the fuel elements, a venting system comprising, a first fission product trap in each fuel element, a first manifold system in each fuel element for conducting fission products from each of the sealed containers therein to said first fission product trap therein, a second fission product trap, a second manifold system in the supporting structure connecting each of said first fission product traps to said second fission product trap, means for maintaining the pressure at said second fission trap and in said first and second manifold systems substantially less than the coolant gas pressure, and for maintaining the pressure at said second fission product trap sufficiently lower than the pressure in said first and second manifold systems that fission product gases will be withdrawn from the containers toward said first and second fission product traps, and a gas bleed passage for each fuel element communicating with the second manifold system between said first fission product trap and said second fission product trap for bleeding coolant gas into said second manifold system, said bleed passage being of a size to admit coolant gas to said vent passage system in a quantity sufficient to facilitate the transportation of fission products to said second fission product trap.

References Cited

UNITED STATES PATENTS

| | | | |
|---|---|---|---|
| 3,141,829 | 7/1969 | Fortescue et al. | 176—37 X |
| 3,201,320 | 8/1965 | Fortescue et al. | 176—37 X |
| 3,207,670 | 9/1965 | Fortescue et al. | 176—37 |
| 3,432,388 | 3/1969 | Fortescue | 176—37 |
| 3,533,911 | 10/1970 | Fortescue et al. | 176—30 |

BENJAMIN R. PADGETT, Primary Examiner

H. E. BEHREN, Assistant Examiner

U.S. Cl. X.R.

176—68, 78

UNITED STATES PATENT OFFICE
CERTIFICATE OF CORRECTION

Patent No. 3,743,576    Dated July 3, 1973

Inventor(s) Peter Fortescue

It is certified that error appears in the above-identified patent and that said Letters Patent are hereby corrected as shown below:

Column 1, line 48  -  "shoul" should read "should".

Column 3, line 62  -  "positive" should read "position".

Column 4, line 24  -  "and" should follow   41.

Column 4, line 39  -  "passage" should read "passages".

Column 6, line 70  -  "with" should read "within".

Claim 5, line 14,  -  "strure" should read "structure".

Claim 5, line 15   -  "includes" should read "include".

Signed and sealed this 25th day of December 1973.

(SEAL)
Attest:

EDWARD M. FLETCHER, JR.          RENE D. TEGTMEYER
Attesting Officer                Acting Commissioner of Patents